(12) United States Patent
Gauthier et al.

(10) Patent No.: US 9,927,118 B2
(45) Date of Patent: Mar. 27, 2018

(54) CHEMICAL LOOPING COMBUSTION METHOD WITH A REACTION ZONE INCLUDING A GAS-SOLID SEPARATION ZONE AND PLANT USING SAME

(75) Inventors: Thierry Gauthier, Brignais (FR); Ali Hoteit, Paris (FR); Florent Guillou, Ternay (FR); Helene Stainton, Lyons (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 482 days.

(21) Appl. No.: 13/701,221

(22) PCT Filed: May 24, 2011

(86) PCT No.: PCT/FR2011/000308
§ 371 (c)(1),
(2), (4) Date: Feb. 1, 2013

(87) PCT Pub. No.: WO2011/151535
PCT Pub. Date: Dec. 8, 2011

(65) Prior Publication Data
US 2013/0149650 A1 Jun. 13, 2013

(30) Foreign Application Priority Data
Jun. 2, 2010 (FR) ...................... 10 02325

(51) Int. Cl.
*F23C 10/01* (2006.01)
*F23C 10/04* (2006.01)
(Continued)

(52) U.S. Cl.
CPC ............. *F23C 10/01* (2013.01); *B01J 8/0055* (2013.01); *B01J 8/26* (2013.01); *B01J 8/388* (2013.01);
(Continued)

(58) Field of Classification Search
CPC .......... F23C 10/01; F23C 10/04; F23C 10/08; F23C 9/06; F23C 10/26; F23C 6/042;
(Continued)

(56) References Cited

U.S. PATENT DOCUMENTS 2,580,317 A * 12/1951 Pekar ........................ B04C 3/00
55/426
4,248,164 A 2/1981 Isheim
(Continued)

FOREIGN PATENT DOCUMENTS

EP 0 211 483 A3 2/1987
EP 2 107 302 A1 10/2009
(Continued)

*Primary Examiner* — Avinash Savani
*Assistant Examiner* — Rabeeul Zuberi
(74) *Attorney, Agent, or Firm* — Fitch, Even, Tabin & Flannery, LLP (57) ABSTRACT

The object of the invention is a combustion method for a solid feed using a chemical loop wherein an oxygen-carrying material circulates, said method comprising at least:
  contacting the solid feed particles in the presence of metallic oxide particles in a first reaction zone (R1) operating in dense fluidized bed mode,
  carrying out combustion of the gaseous effluents from first reaction zone (R1) in the presence of metallic oxide particles in a second reaction zone (R2),
  separating in a separation zone (S3) the unburnt particles and the metallic oxide particles within a mixture coming from second reaction zone (R2),
  re-oxidizing the metallic oxide particles in an oxidation zone (R4) prior to sending them back to first zone (R1).

23 Claims, 4 Drawing Sheets

(51) Int. Cl.
*F23C 10/08* (2006.01)
*C10J 3/72* (2006.01)
*F23C 6/04* (2006.01)
*F23C 10/00* (2006.01)
*F23C 10/10* (2006.01)
*B01J 8/26* (2006.01)
*B01J 8/38* (2006.01)
*B01J 8/00* (2006.01)
*C10J 3/56* (2006.01)

(52) U.S. Cl.
CPC ............ *C10J 3/56* (2013.01); *C10J 3/725* (2013.01); *F23C 6/04* (2013.01); *F23C 10/005* (2013.01); *F23C 10/04* (2013.01); *F23C 10/08* (2013.01); *F23C 10/10* (2013.01); *B01J 2208/0084* (2013.01); *C10J 2300/093* (2013.01); *C10J 2300/0916* (2013.01); *C10J 2300/0943* (2013.01); *C10J 2300/0946* (2013.01); *C10J 2300/0959* (2013.01); *C10J 2300/0976* (2013.01); *C10J 2300/1606* (2013.01); *F23C 2900/99008* (2013.01); *F23J 2217/40* (2013.01); *Y02E 20/346* (2013.01)

(58) Field of Classification Search
CPC .... F23C 13/06; F23C 2206/103; F23C 10/10; F23C 6/04; F23C 10/005; B01J 8/00; B01J 23/755; B01J 8/388; B01J 8/26; C10J 3/56; C10J 3/725; Y02E 20/346; F23J 7/00

USPC ...................................................... 431/7, 170
See application file for complete search history.

(56) References Cited

U.S. PATENT DOCUMENTS

| | | | |
|---|---|---|---|
| 4,788,919 A * | 12/1988 | Holm | ...................... B01J 8/28 110/245 |
| 6,569,317 B1 * | 5/2003 | Dirkse | .................. B01J 8/0035 208/163 |
| 2005/0175533 A1 * | 8/2005 | Thomas | ................. C01B 3/063 423/657 |
| 2006/0130719 A1 * | 6/2006 | Morin | ................... F23C 10/002 110/348 |
| 2007/0232818 A1 * | 10/2007 | Crawford et al. | ............. 554/174 |
| 2009/0222110 A1 * | 9/2009 | Lou | ........................ G05B 13/04 700/50 |
| 2011/0171588 A1 * | 7/2011 | Gauthier | ............... F23C 10/005 431/7 |

FOREIGN PATENT DOCUMENTS

| | | |
|---|---|---|
| FR | 2 556 983 A1 | 6/1985 |
| FR | 2 850 156 A1 | 7/2004 |
| FR | 2 936 301 A1 | 3/2010 |
| JP | 61-186705 | 8/1986 |

* cited by examiner

CHEMICAL LOOPING COMBUSTION METHOD WITH A REACTION ZONE INCLUDING A GAS-SOLID SEPARATION ZONE AND PLANT USING SAME

FIELD OF THE INVENTION

The invention relates to the sphere of chemical looping combustion (CLC) for the production of energy, syngas and/or hydrogen.

BACKGROUND OF THE INVENTION

A chemical looping combustion process generally comprises one or more reaction zones wherein combustion of a fuel is conducted by contacting with an oxygen-carrying solid that is thereafter re-oxidized in at least one oxidation zone by contacting with air or water vapour prior to being sent back to the combustion (or reduction) zone(s).

Chemical looping combustion thus consists in contacting in an enclosure at high temperature a gaseous, liquid and/or solid hydrocarbon feed with an oxygen-carrying metallic oxide type solid. The metallic oxide yields part of the oxygen it contains, which takes part in the combustion of the hydrocarbons.

After combustion, the fumes contain predominantly carbon oxides, water and possibly hydrogen. In fact, it is not necessary to contact the hydrocarbon feed with air and the fumes are then predominantly made up of combustion gases and possibly of a dilution gas used for transport and fluidization of the particles (water vapour for example).

It is thus possible to produce predominantly nitrogen-free fumes with high $CO_2$ contents (>90 vol. %) allowing to consider $CO_2$ capture, then storage. The metallic oxide that has taken part in the combustion is then carried to another reaction enclosure where it is contacted with air in order to be re-oxidized.

Implementing a chemical looping combustion method requires large amounts of metallic oxides in order to burn all of the fuel. These metallic oxides are generally contained either in ore particles or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel oxide for example) have been deposited.

The maximum oxygen capacity really available varies considerably from one oxide to another, generally ranging between 0.1 and 15%, often between 0.3 and 6 wt. %. Implementation in fluidized bed mode is therefore particularly advantageous for conducting the combustion. In fact, the finely divided oxide particles circulate more readily in the combustion and oxidation reaction enclosures, and between these enclosures, if the properties of a fluid are conferred on the particles.

Patent application FR-2,850,156 describes a chemical looping combustion method wherein the fuel is crushed prior to being fed into the reduction reactor operating in circulating fluidized bed mode. The reduced size of the solid fuel particles allows more complete and faster combustion, and it allows to produce nearly 100% fly ashes that are separated from the circulating oxides. Separation downstream from the circulating bed is first provided by a cyclone, then by a device allowing the unburnt particles to be separated from the metallic oxide particles. Unburnt particles entrainment in the oxidation zone and therefore $CO_2$ emissions in the oxidation reactor effluents is thus prevented.

The separation device comprises a bed fluidized by water vapour, which allows to separate the fine and light particles such as carbon-containing residues and to feed them into the reactor again, whereas the denser and bigger oxide particles are transferred to the oxidation reactor. This device is a relatively sophisticated equipment since it contains two internal compartments.

Furthermore, according to document FR-2,850,156, the fly ashes are separated from the oxide particles in a second circuit where a separator operating in fluidized bed mode conducts the separation, the fluidized fly ashes being sent to a silo via a pneumatic transport device and the metallic oxides being extracted at the base of the fluidized-bed reactor after decanting.

Besides, the high gas velocities involved in the reduction reactor operating in circulating fluidized bed mode do not allow to obtain sufficient particle residence times for gasification of all the solid fuel, then for combustion of the gasification products. Significant recycling of the unburnt particles by passage through the separator is therefore necessary. Now, separating the unburnt particles from the oxide particles is a delicate operation because it requires supplying additional gas in large amounts, which is energy-consuming.

Furthermore, due to the too short residence time, it is difficult to achieve total combustion and the fumes contain large amounts of CO and of $H_2$, which involves the presence of a post-combustion zone downstream from the process.

N. Berguerand's thesis "Design and Operation of a 10 kWth Chemical-Looping Combustor for Solid Fuels", ISBN 978-91-7385-329-3, describes a device allowing to carry out coal combustion using a chemical loop.

This device is made up of an oxidation reactor using metallic particles, a cyclone allowing separation of the particles and of the depleted air after oxidation, a fluidized bed supplied with oxidized metallic oxides through the return leg arranged below the cyclone, wherein reduction of the metallic oxide is carried out through combustion of the coal. The coal is fed to the upper part of the fluidized bed, in the dilute phase. In the reduction reactor, combustion of the coal occurs progressively: the coal particles start flowing down and are devolatilized in the dilute phase, countercurrent to the fluidization gases, wherein the metallic oxides are present only in small amounts ; they are then contacted with the fluidized metallic oxides in the dense phase. The long residence time allows to gasify the coal and to produce combustion gases containing large amounts of carbon monoxide and of hydrogen that pass into the dilute phase.

In the dense phase of the reactor, the fluidization rates are low—generally ranging between 5 and 30 cm/s—, which does not allow the entrainment of significant amounts of metallic oxides in the dilute phase likely to promote the combustion of gases such as CO, $H_2$ or the volatilized hydrocarbons that are discharged from the dilute zone. The amounts of CO and of hydrocarbons (HC) in the reduction reactor effluents are therefore significant and above several percents by volume. The combustion efficiency is thus not very good and a post-combustion zone is also necessary to complete the combustion.

Furthermore, according to this document, the reduction reactor is equipped with a particle separator integrated in the dense phase, which requires supplying additional gas for separation.

The applicants have developed an improved chemical looping combustion method that allows, even from fuel particles in coarse state, to obtain total combustion of the solid feed while minimizing the amount of solid feed to be recycled, which allows the energy efficiency of the method to be maximized.

The combustion method according to the invention allows to capture at least 90% of the $CO_2$ emitted by the combustion in the fumes directly at the combustion reactor outlet, the capture rate being defined by the ratio:

$$\frac{\text{Amount of } CO_2 \text{ emitted in the fumes from the combustion reactor}}{\text{Amount of } CO_2 \text{ emitted in the chemical looping combustion process}}$$

At the outlet of the combustion process according to the invention, the $CO/CO_2$ molar ratio of the fumes downstream from the cyclones is below 0.05 and the $H_2/H_2O$ ratio is below 0.05.

In the chemical looping combustion method according to the invention, on the one hand, contact between the particles carrying the oxygen and the solid fuel is optimized to promote the coal gasification reactions and, on the other hand, contact between the gasification products and the metallic oxides is also optimized so as to produce effluents that have undergone total combustion ($H_2$, CO and HC<1 vol. % in the fumes).

Besides, according to the invention, separation of the unburnt particles from the metallic oxide particles is carried out upstream from the reduction reactor fumes dedusting stage so as to make best use of the maximum kinetic energy of the fumes for separation of the two types of particle.

SUMMARY OF THE INVENTION

The present invention thus relates to a combustion method for a solid feed using a chemical loop wherein an oxygen-carrying material circulates, said method comprising at least:
  contacting the solid feed particles in the presence of metallic oxide particles in a first reaction zone operating in dense fluidized bed mode,
  carrying out combustion of the gaseous effluents from the first reaction zone in the presence of metallic oxide particles in a second reaction zone,
  separating in a separation zone the unburnt particles and the metallic oxide particles within a mixture coming from the second reaction zone,
  re-oxidizing the metallic oxide particles in an oxidation zone prior to sending them back to the first reaction zone.

The mixture of particles to be separated in the separation zone can be supplied in a dilute phase of the fluidized bed of this zone.

The solid feed can be selected from among coal, coke, pet coke, biomass, bituminous sands and household waste.

The mean residence time of the solid phase in the reaction zone can range between 0.25 and 20 minutes, and the superficial gas velocity can range between 0.3 and 3 m/s.

The mean residence time of the gas in the second zone can range between 1 and 20 seconds, and the mean residence time of the solids can range between 2 seconds and 1 minute, the void fraction in the zone being above 0.9.

In the separation zone, a gas flow of imposed velocity can be induced at least at 80% by the gaseous effluent containing the particles from the second zone.

In the separation zone, the superficial gas velocity in the dilute phase of the separation zone can be set at a value ranging between 30 and 300% of the mean terminal fall velocity of the oxygen-carrying particles.

At the separation zone outlet, the gas stream containing the light particles and a fraction of oxygen-carrying particles is sent to at least one gas-solid separation stage so as to recover nearly all of the particles contained in the gas stream coming from the separation zone, which are then recycled to the reaction zone.

A mixture of particles and of gas can be allowed into the separator enclosure. The particles can be extracted through an outlet in the upper part of the enclosure and a discharge line in the lower part of this enclosure, the intake and extraction parameters being so selected as to create in the enclosure a lower dense phase and an upper dilute phase, a dilute phase into which said mixture is allowed.

The separator enclosure can be supplied with a gas coming from an external source.

The invention also relates to a plant for carrying out combustion of a solid feed, said plant comprising at least:
  a first reaction zone comprising a solid feed, a fluidization gas and a oxygen-carrying particle feed point,
  a second reaction zone receiving, through a feed point, the combustion gases containing particles from the first reaction zone,
  a separation zone receiving, through the intake thereof, a gaseous effluent from the second zone, containing ashes, oxygen-carrying particles and unburnt particles,
  an oxidation zone supplied with oxygen-carrying particles by the separation zone and with air.

The second reaction zone can comprise a fresh oxygen-carrying solid feed point.

The second reaction zone can comprise an oxygen feed point.

The separation zone can comprise an enclosure with at least one delivery line for said mixture, a discharge line arranged in the lower part of the enclosure and an outlet line arranged in the upper part of the device, the intake and discharge/outlet parameters being so selected as to create in the enclosure a dense phase in the lower part and a dilute phase in the upper part, said delivery line opening into the dilute phase.

The separator enclosure can also comprise a delivery line for a gas coming from an external source.

The section of flow of the second reaction zone can be smaller than the section of flow of the first reaction zone.

At least one gas-solid separation stage can be provided for recovering the particles contained in the gas stream from the separation zone and for recycling them through a line to the first reaction zone.

The plant can comprise two gas-solid separation stages wherein one of the separation stages is supplied with a gas stream containing particles coming from the other separation stage.

At least one enclosure containing a fluidized bed for separation of the light particles remaining among the unburnt particles can be present on the lines.

BRIEF DESCRIPTION OF THE FIGURES

The invention is illustrated from FIGS. 1 to 4 by way of non-limitative example:
FIG. 1 describes the general principle of the invention,
  FIG. 2 describes a particular embodiment of reaction zones (R1), (R2) and of separation zone (S3)

DETAILED DESCRIPTION

Figure 1:
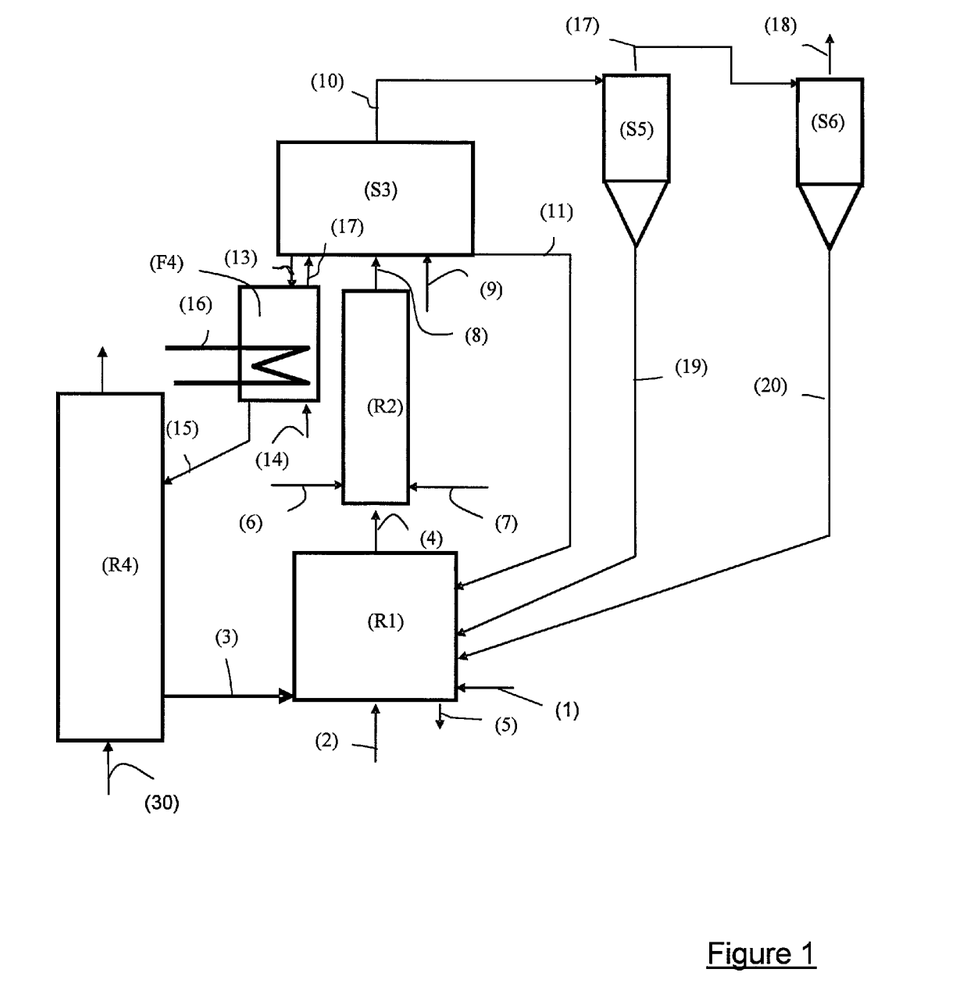

In FIG. 1, reaction zone or reactor (R1) is supplied with fuel, a solid fuel here, through a line (1). The solid fuel can be supplied through a line penetrating the reactor. The solid fuel particle flow is either continuous or intermittent, with an injection frequency corresponding to a period equal to at least half the mean residence time of all the solid fuel particles in reaction zone (R1).

The solid fuel is injected into reaction zone (R1) where it undergoes devolatilization of the volatile compounds, which generally represent 5 to 50 wt. % of the solid fuel depending on the origin thereof, upon contact with the oxygen-carrying particles coming from an oxidation line (R4) and supplied through a line (3).

Reaction zone (R1) is also fed with a fluidization gas delivered through a line (2). The fluidization means (not shown) are known to the person skilled in the art and are, for example, flat or truncated-cone-shaped distribution grids, distribution rings or spargers. In order to promote gasification reactions, the fluidization gas injected is preferably water vapour, or optionally a mixture of water vapour and of $CO_2$. The temperature in reaction zone (R1) is substantially homogeneous considering the fluidization conditions leading to the formation of a dense phase. The temperature is preferably above 800° C. and it preferably ranges between 900° C. and 1000° C., so as to minimize the time required for gasifying the solid fuel.

The metallic oxide particles and an unburnt solid fuel fraction, accompanied by the combustion gases containing water vapour, nitrogen, hydrogen, CO and/or $CO_2$, or a mixture of these gases, flow out of reaction zone (R1) through a line (4). Line (4) provides transfer of the gas mixture containing the particles to a second reaction zone (R2). Line (4) is preferably a line of variable section so as to provide a junction between reaction zones (R1) and (R2).

A line (5) also allows to extract, in the lower part of reaction zone (R1), the ashes formed and agglomerated in the reactor, and possibly oxygen-carrier particles and unburnt particles.

Second reaction zone (R2) provides combustion of the gas mixture from reaction zone (R1). In order to promote total combustion, it is possible to introduce a certain amount of totally oxidized fresh oxygen-carrying solid through a line (6). Oxygen can also be directly injected through a line (7).

At the outlet of second reaction zone (R2), the particle-containing gaseous effluent is extracted through a line (8) and sent to a separation zone (S3) wherein fast separation of the lighter particles—predominantly unburnt particles and possibly fly ashes and metallic oxide fines—extracted through a line (10) with the gas and of the heavier particles—predominantly metallic oxide particles—extracted in the lower part of separation zone (S3) through a line (13) supplying an enclosure (F4) that serves as a buffer zone is carried out. Buffer zone (F4) can be a concentric fluidized bed peripheral to second reaction zone (R2), fluidization being obtained by injection of a gas supplied through a line (14). Advantageously, the latter takes part in the separation in separation zone (S3) by being channelled toward this zone through a line (17). In this fluidized bed of the buffer zone, it is advantageous to have heat exchange means (16) that can be tubes on the wall or in the fluidized bed allowing to recover a variable part representing generally 5 to 60% of the heat produced in the chemical looping combustion method. A line (15) allows to withdraw the oxygen-carrying particles from the buffer zone to an oxidation zone (R4) so as to re-oxidize them.

In separation zone (S3), it is also possible to introduce through a line (9) a gas coming from an external source. This gas can contain oxygen or an oxidizing gas for continuing the CO and hydrogen combustion reactions in separator (S3).

Part of the heavy particles that have decanted (predominantly oxygen-carrying particles) is extracted from separation zone (S3) through a line (11) and recycled to reaction zone (R1). It is thus optionally possible to promote the temperature homogeneity in reaction zones (R1), (R2) and in separation zone (S3).

At the outlet of separation zone (S3), a line (10) carries the gas stream containing the lighter particles—predominantly unburnt particles and possibly fly ashes—and a minor fraction of oxygen-carrying particles to at least one gas-solid separation stage, here two gas-solid separation stages (S5, S6), cyclones for example, which allow to recover nearly all of the particles contained in the gas stream of line (10), which are then recycled to reaction zone (R1) respectively through lines (19) and (20), optionally after removing the fly ashes through fluidized-bed elutriation for example.

At the outlet of first cyclone (S5), the gas stream is extracted through a line (17) and sent to second cyclone (S6) and, at the outlet of this cyclone (S6), the practically particle-free gas whose particle content generally ranges only between 100 mg/m³ and 1 g/m³ is extracted through a line (18).

The chemical looping method for combustion of a solid feed wherein an oxygen-carrying material circulates thus comprises at least a first reaction zone (R1) operating in dense fluidized bed mode and allowing the solid feed particles to be gasified in the presence of metallic oxide particles; a second combustion or reduction reaction zone (R2) preferably operating in dilute fluidized bed mode and allowing to carry out combustion of the gaseous effluents from first reaction zone (R1) in the presence of metallic oxide particles; a separation zone (S3) providing a separation within a mixture containing gas, unburnt particles, metallic oxide particles, said mixture coming from second reaction zone (R2), and said separation zone comprising an enclosure into which the mixture of particles to be separated is allowed in a dilute phase in which flows a gas at an imposed ascending rate; a metallic oxide particle oxidation zone (R4) allowing said particles to be re-oxidized prior to being sent to reaction zone (R1).

What is referred to as a dense fluidized bed is a fluidized bed wherein gas fraction $\epsilon_g$ is below 0.9, preferably below 0.8.

What is referred to as a dilute fluidized bed is a fluidized bed wherein the volume fraction of the metallic oxide particles is below 10 vol. %.

Advantageously, reaction zone (R1) is supplied with:
- a solid feed, dry or partly wet, in form of dry or partly wet particles, of grain size generally ranging between 100 microns and 10 mm, preferably between 100 and 500 microns,
- oxygen-carrying particles directly coming from oxidation zone (R4),
- oxygen-carrying particles coming from one or more gas-particle separator cyclones (S5, S6) arranged downstream from second reaction zone (R2), a fluidization gas, generally nitrogen, water vapour and/or recycled $CO_2$, preferably water vapour. In the case of water vapour or $CO_2$, the gas can take active part in the gasification of the solid fuel.

In reaction zone (R1), the mean residence time of the solid phase (solid fuel and oxygen carrier) ranges between 0.25 and 20 minutes, preferably between 2 and 10 minutes. The superficial gas velocity generally ranges between 0.3 and 3 m/s (under the reaction conditions at the outlet of reaction zone (R1)).

The metallic oxide concentration in reaction zone (R1) is at least 10 vol. %.

The temperature generally ranges between 800° C. and 1000° C., it is preferably above 900° C.

Implementing a chemical looping combustion method according to the method of the invention requires significant amounts of metallic oxides. These metallic oxides are generally contained either in ore particles or in particles resulting from industrial treatments (residues from the iron and steel industry or from the mining industry, used catalysts from the chemical industry or refining). They can also be obtained from synthetic materials such as, for example, alumina or silica-alumina supports on which metals that can be oxidized (nickel oxide for example) have been deposited. The oxygen capacity really available varies considerably from one oxide to another, generally ranging between 0.1 and 15%, often between 0.3 and 3 wt. %. Implementation in fluidized bed mode is therefore particularly advantageous for conducting the combustion. In fact, the finely divided oxide particles circulate more readily in the combustion and oxidation reaction enclosures, and between these enclosures, if the properties of a fluid are conferred on the particles.

The size and density of the oxygen-carrying particles are generally much greater than those of the fly ashes and the unburnt particles that have been contacted with the oxygen-carrying particles in the high-temperature combustion zone. At the combustion zone outlet, the size of the unburnt coal particles is estimated to be below 100 microns and the size of the major part of the particles is below 150 microns. The density of these particles generally ranges between 1000 and 1500 kg/m³.

Other particles such as fly ashes resulting from the combustion of the solid feed can also circulate with the rest of the particles and they are characterized by a lower particle size and density than the oxygen-carrying particles, and often also lower than the unburnt particles.

The gaseous and solid effluents from reaction zone (R1) flow into second reaction zone (R2), except for a very small fraction of agglomerated ash particles that can be withdrawn at the bottom of reaction zone (R1).

The section of flow of second reaction zone (R2) is strictly smaller than the section of flow of reaction zone (R1). Preferably, the section of flow of second reaction zone (R2) is at least 25% smaller than that of reaction zone (R1), more preferably at least 50%.

Thus, the change in section allows to increase the velocity between reaction zones (R1) and (R2), and to provide transition between the dense phase flow and the dilute phase flow.

Combustion of the gaseous effluent is carried out in second reaction zone (R2).

Considering the gas velocities, the mean residence time of the gas in this zone generally ranges between 1 and 20 seconds, the mean residence time of the solids ranging between 2 seconds and 1 minute.

Under such conditions, and considering the dilute nature of the flow and the presence of the oxygen carrier, the reactions are essentially reactions between the gas phase and the solid. These reactions are typically conversion of CO and $H_2$ to $CO_2$ and $H_2O$.

In order to promote total combustion of the hydrocarbons leaving this zone, it may be an advantage to inject oxygen into this zone, either in form of fresh oxygen-carrying particles from an oxidation zone or in form of gaseous oxygen.

Furthermore, it may also be an advantage to inject part of the solid fuel into this second reaction zone, notably if the fuel has a high volatile matter content. Thus, the gas feed in reaction zone (R1) is limited and the reactor diameter is consequently smaller.

Some solid fuels are indeed known to have high volatile matter contents, ranging for example between 25 and 50%.

In this second reaction zone, the solid volatile matter is devolatilized and can burn rapidly. On the other hand, the non-volatilized solid fuel residue (char) has no time to react considering the too short residence time—and moreover the too short contact time with the oxygen carrier—in this reaction zone. It is recycled to reaction zone (R1) after separation, in downstream separation zone (S3), from the gaseous effluent from second reaction zone (R2).

Second reaction zone (R2) operates in dilute fluidized bed mode wherein all of the solids are transported. The residence time of the gas phase generally ranges between 1 and 20 seconds, the transported solid flow rate ranges between 25 and 500 kg/s/m², preferably between 60 and 300 kg/s/m².

The superficial gas velocity is above 3 m/s and below 30 m/s, and it preferably ranges between 5 and 15 m/s (expressed under the conditions), so as to facilitate transport of all of the particles while minimizing pressure drops in order to optimize the energy efficiency of the method.

In this zone, the flow is dilute and the essential part of the volume is occupied by the gas. Thus, the void fraction is generally above 90% or even above 95%.

The particles transported with the gas are of different natures. There are:
- the oxygen-carrying particles that have yielded at least part of their oxygen upon passage through reaction zone (R1) or second reaction zone (R2),
- the unburnt solid fuel particles (or unburnt particles) injected into reaction zone (R1) and that have not been totally gasified, or injected into second reaction zone (R2) and that have essentially undergone devolatilization,
- possibly the fly ashes resulting from total combustion of the solid fuel particles and whose residence time in reaction zones (R1) and (R2) has been sufficient.

At the outlet of second reaction zone (R2), the gaseous effluents are sent to separation zone (S3).

Separation zone (S3) thus allows to separate, within the gaseous mixture from combustion zone (R2), the heavier particles from the lighter particles. The heavier particles essentially consist of the metallic oxide particles to be recycled, and the lighter particles consist of unburnt particles to be recycled to reaction zone (R1) and possibly of fly ashes.

Within separation zone (S3), the superficial velocity of the gas stream is higher than the terminal fall velocity of the unburnt fuel particles so as to allow entrainment thereof with the gas.

Thus, by subjecting the mixture of particles from second reaction zone (R2) to an imposed velocity gas flow, it is possible to achieve "fast" separation of the heavier particles and of the lighter particles.

What is referred to as fast separation is a separation performed within less than 1 minute and preferably less than 20 seconds, this time corresponding to the residence time of the lighter particles in the dilute phase of the separator.

The dilute phase generally has a solids content below 5% or even below 1% (by volume).

The separation zone (or separator) comprises at least an enclosure with an intake line (8) for said mixture, a discharge line (13) arranged in the lower part of the enclosure and an outlet line (10) arranged in the upper part of the device, the intake and discharge/outlet parameters being so selected as to create in the enclosure a dense phase in the lower part and a dilute phase in the upper part, wherein said intake line opens into the dilute phase.

Thus, separation is carried out in the dilute phase of the separator so as to obtain the best possible separation efficiency.

The separation efficiency can be defined by the formula as follows:

X=amount of unburnt particles entrained with the gas/total amount of unburnt particles in the mixture of particles entering the separator.

Implementation of the device according to the invention allows to obtain a separation efficiency generally above 70%, or even above 80%.

This good separation efficiency allows to optimize the $CO_2$ capture rate of the method, the latter being defined by the ratio of the amount of $CO_2$ emitted in the combustion zone to the total amount of $CO_2$ emitted in the CLC loop.

Implementing the method according to the invention allows to obtain a capture rate above 90%.

For example, with an 80% separation efficiency, it is possible to reach a 90% capture rate while having a limited gasification progress in reaction zone (R1).

Thus, for example, the fact that a 80% separation efficiency is obtained allows a gasification reaction progress within a range from 50 to 70% in reaction zone (R1) depending on the recycles and the volatile matter content of the feed.

It is therefore possible to limit the residence time of the feed in reaction zone (R1) and to have a more compact reaction zone (R1).

Preferably, the imposed-velocity gas flow is entirely induced by the gaseous effluent containing the particles from second reaction zone (R2), but it is also possible to adjust the velocity by supplementary injection of a gas coming from an external source, which can also contribute to the fluidization of a dense phase accumulating the settled particles.

The superficial gas velocity in the dilute phase of the separation zone is preferably set at a value generally ranging between 30 and 300% of the mean terminal fall velocity of the oxygen-carrying particles, preferably ranging between 50 and 150%, and more preferably between 75 and 125%.

The mean terminal fall velocity is obtained from the formula as follows (*):

$$V_t = \left(\frac{4d_p(\rho_s - \rho_g)g}{3\rho_g C_D}\right)^{1/2}$$

where: $d_p$ is the mean particle diameter
$\rho_s$ is the particle density (kg/m$^3$)
$\rho_g$ is the gas density (kg/m$^3$)
$C_D$ the drag coefficient
(*) in: Fluidization Engineering, Butterworth-Heinemann, Daizo Kunii, Octave Levenspiel, p. 80.

As already described above, at the outlet of separation zone (S3), the gas stream containing the lighter particles is sent to one or more gas-solid separation cyclones (S5, S6). At the outlet of the cyclone(s), the gas stream contains no more than a particle content generally ranging between 100 mg/m$^3$ and 1 g/m$^3$. Further treatments are possible, such as ultimate dedusting, water condensation, heat recovery, deSOx, deNOx, etc.

The oxygen-carrying particles directly withdrawn from the lower part of separation zone (S3) are sent to an oxidation reaction zone (R4) made up of one or more fluidized beds arranged in parallel or in series and supplied with air or oxidizing gas such as air or water vapour.

Oxidation zone (R4) operates in fluidized bed mode at a temperature generally ranging between 700° C. and 1200° C., preferably between 950° C. and 1100° C., depending on the rate of circulation of the metallic oxides between the combustion zone and the oxidation zone, and on the oxygen transfer capacity of the material.

Once the oxygen-carrying particles re-oxidized, they are sent back to reaction zone (R1) through line (3).

Figure 2:
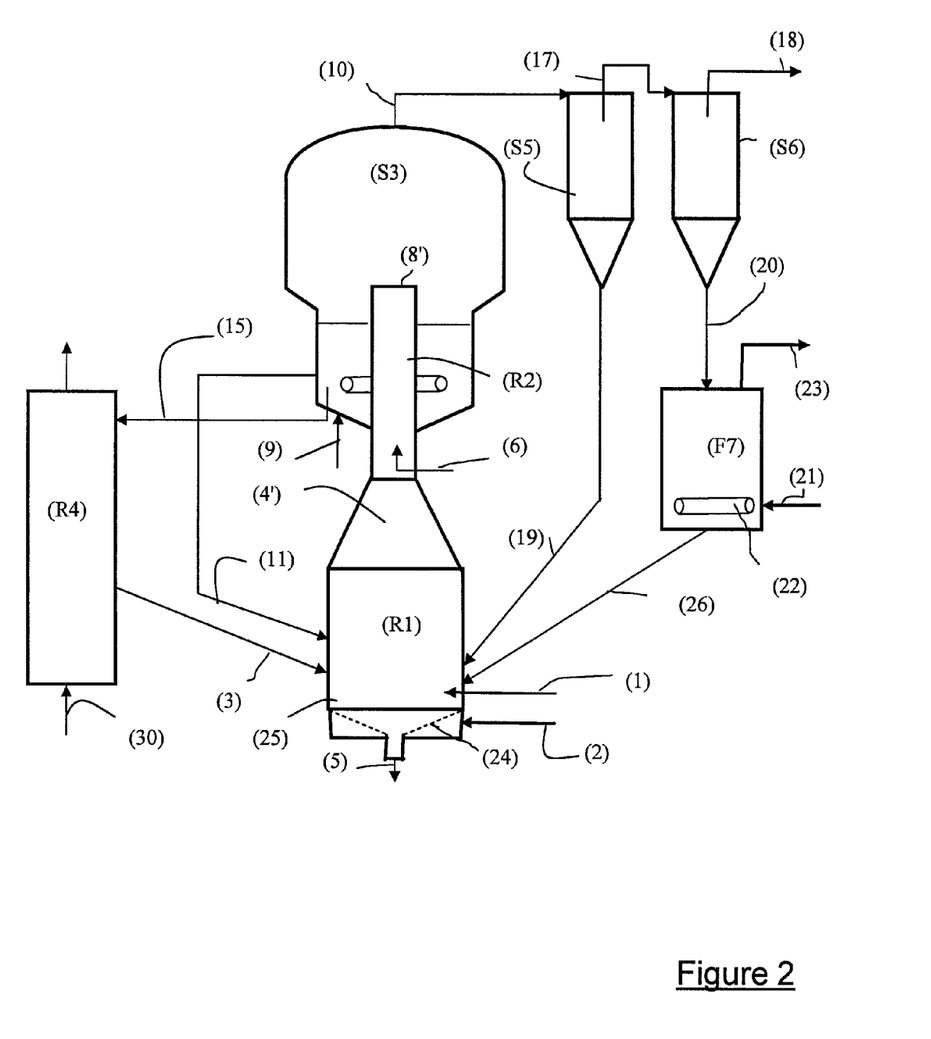

FIG. 2 shows the main elements of FIG. 1 more precisely.

Thus, at the level of reaction zone (1), a fluidization gas is introduced through specific means which are perforated plates (24) arranged downstream from a wind box (25) fed through a line (2). These plates are inclined at an angle generally ranging between 30° and 70° to the horizontal and they provide, in the central part, a free space through which the particles are allowed to flow, which enables to withdraw through distributor (25) part of the particles settling in this zone and predominantly made up of agglomerated ashes.

The section of flow of reaction zone (R1) is substantially constant and the mean superficial velocity in this zone generally ranges between 0.3 and 3 m/s.

The void fraction within reaction zone (R1) is below 0.9 and it preferably ranges between 0.5 and 0.8.

In the upper part of reaction zone (R1), a cone (4') allows to discharge the gaseous effluents and the entrained particles towards second reaction zone (R2) consisting of a reactor of elongate shape wherein the gases have a higher superficial velocity than in the first reaction zone. In second reaction zone (R2), an oxygen-carrying particle stream coming from an oxidation zone is introduced through a line (6). According to FIG. 2, this line allows the particles to be fed in the axial direction of the second reaction zone.

Their flow through line (6) is of fluidized type, preferably in dense phase. In some cases, it may be an advantage to feed the particles into second reaction zone (R2) with a dilute type flow. The transport gas is then selected so as to promote conversion of the gas from reaction zone (R1) and it can advantageously contain oxygen.

At the outlet of second reaction zone (R2), the particle-containing gas is sent in the dilute phase of separation zone (S3) through opening (8') located at the top of this second reaction zone (R2). In the dilute phase of separation zone (S3), the velocity is slowed down due to the increase in section of separation zone (S3) so as to allow sedimentation of the heavier particles in the lower part of this zone (S3) and entrainment of the lighter particles to the upper part of the separation zone.

At the outlet of separation zone (S3), a line (10) carries the gas stream containing the lighter particles—predominantly unburnt particles and possibly fly ashes—and a minor fraction of oxygen-carrying particles to the two gas-solid separation cyclone stages (S5, S6) allowing to recover nearly all of the particles contained in the gas stream of line (10) and which are then recycled to reaction zone (R1) respectively through lines (19) and (26).

The heavier particles within the fluidized dense phase settle in the annular space between the outer walls of second reaction zone (R2) and the inner walls of separation zone (S3). Part of the heavier particles is recycled to reaction zone (R1) through a line (11), the other part being withdrawn through a line (15) and sent to oxidation zone (R4).

At the outlet of second cyclone (S6), the entrained particles are extracted through a line (18) and the non-entrained particles are extracted through a line (20) in order to be sent to an enclosure (F7) containing a fluidized bed allowing deeper separation of the light particles (ashes) remaining among the unburnt particles that are then recycled through a line (26) to reaction zone (R1). Fluidization is provided by a gas delivered through a line (21) and distributed by a distributor (22), the fluidization gas being extracted from enclosure (F7) with the fly ash particles through a line (23). Device (F7) can also be arranged on line (19) at the outlet of (S5).

Figure 3:
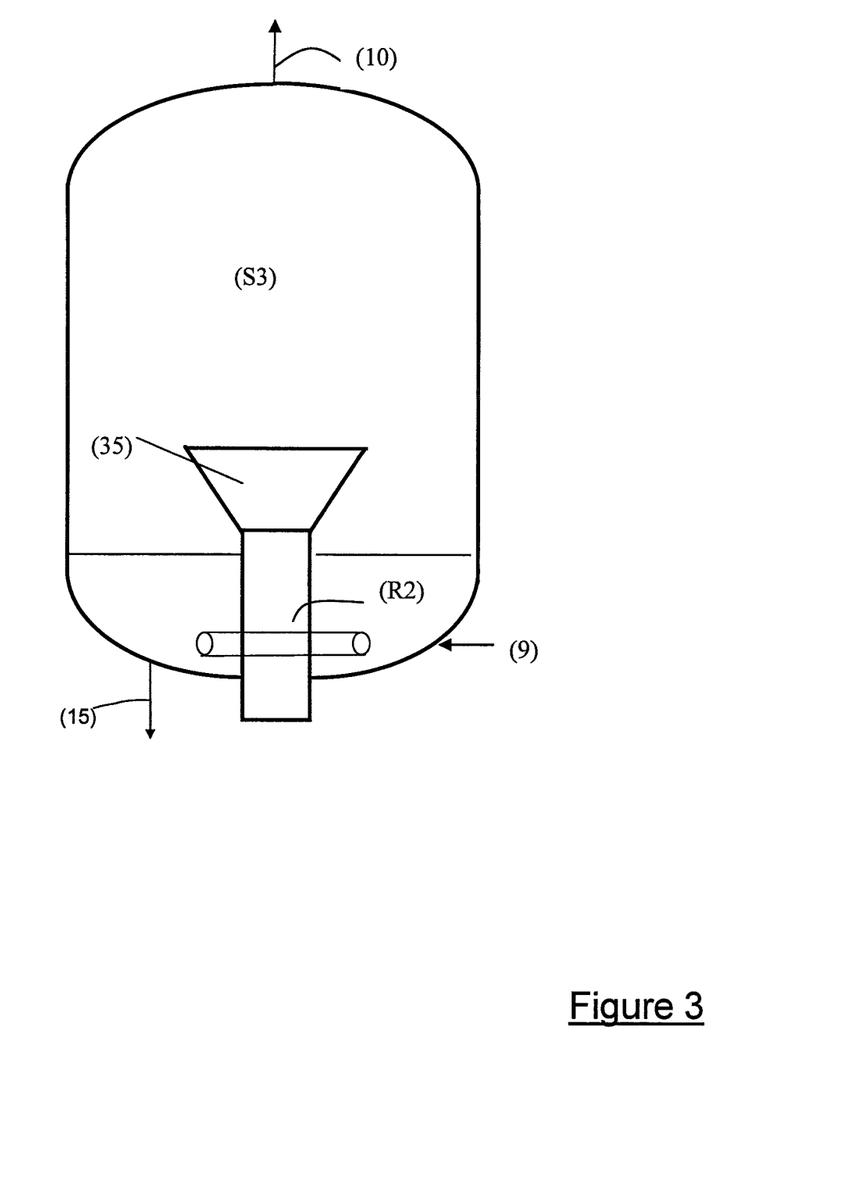
FIG. 3 shows a possible configuration of the connection between second reaction zone (R2) and separation zone (S3)

FIG. 3 shows a connection between second reaction zone (R2) and separation zone (S3) consisting of a divergent cone (35) at an angle advantageously ranging between 6° and 30°. The minimum velocity of the gas at the outlet of cone (35) is above 3 m/s and preferably above 5 m/s so as to reach satisfactory transport conditions at the outlet of second reaction zone (R2).

Proper distribution of the particle-containing gas mixture is thus provided over the entire cross-section of separation zone (S3). Thus, the total height of separation zone (S3) can be limited.

Figure 4:
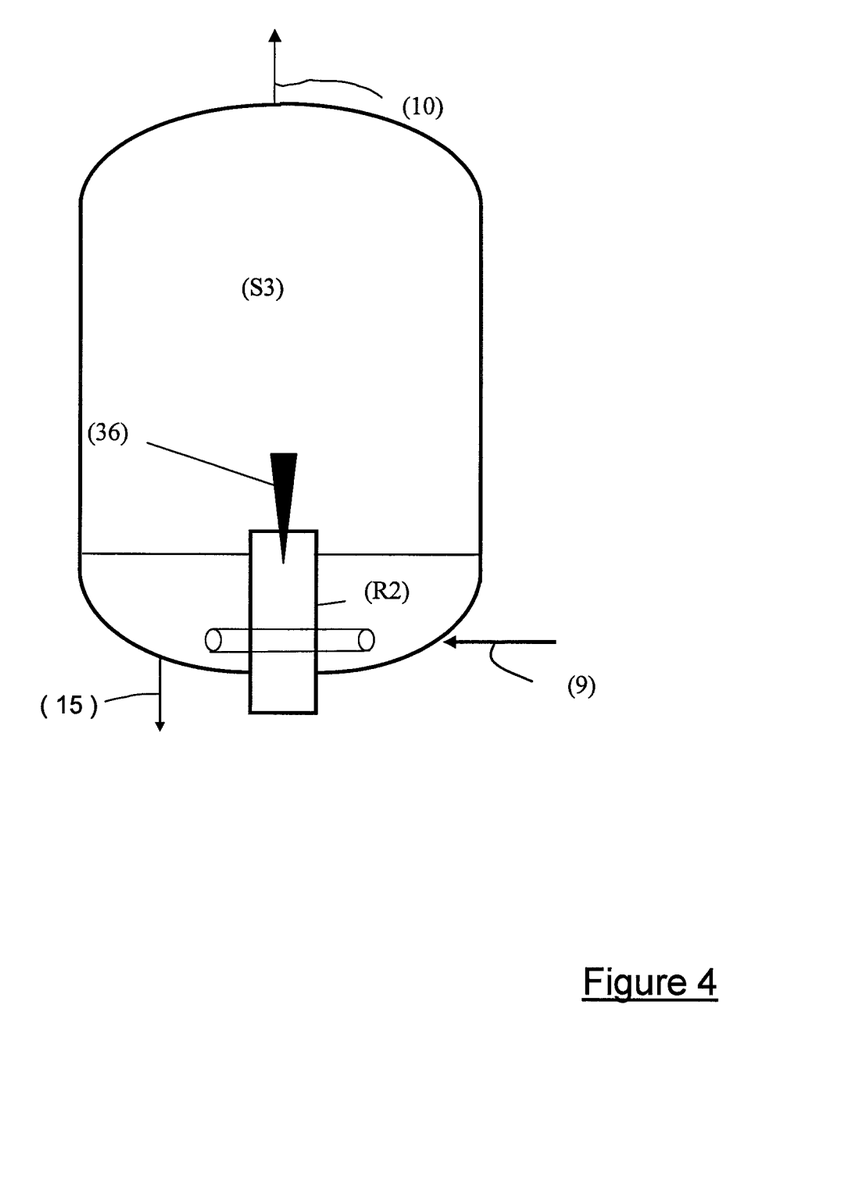
FIG. 4 shows another possible configuration between reaction zone (R2) and separation zone (S3).

Similarly, FIG. 4 shows an insert (36) in form of a divergent cone that allows to facilitate the distribution of the particle-containing gas mixture over the entire section of separation zone (S3).

EXAMPLE

A feed of coal type is treated according to the method of the invention as described in FIG. 1.

We consider a chemical looping combustion with a nominal power of 100 MWth using nickel-based oxygen-carrying particles having the following properties:
density: 2725 kg/m$^3$
reversible transport capacity: 1.48 mass %.

The feed considered is a middle coal having the properties given in the table below:

| Dry coal composition | | |
|---|---|---|
| C | Wt. % | 68.7 |
| H | Wt. % | 5.45 |
| N | Wt. % | 1.65 |
| S | Wt. % | 3.75 |
| Ash | Wt. % | 14.76 |
| O | Wt. % | 5.69 |
| total | Wt. % | 100 |
| Other data | | |
| Fixed carbon (dry mass %) | Wt. % | 58.3 |
| Humidity (air drying) | Wt. % | 4 |
| Net heat capacity (air drying) | kcal/kg | 6145 |
| Net heat capacity (ultimate drying) | kcal/kg | 6335 |
| Volatile matter % | Wt. % | 26.1 |

Considering the power required and the net calorific value (NCV) of the coal of 6145 kcal/kg, the feed flow rate in line (1) is 3.89 kg/s.

The rate of circulation of the oxygen-carrying solid (metallic oxides) required for combustion via line (3) is then 575 kg/s for a transferred amount of $O_2$ of 9.47 kg/s.

The return temperature of the oxygen carrier after passage through oxidation zone (R4) is 1032° C., which results in a mean temperature in reaction zones (R1-R2) and separation zone (S3) of 940° C.

Reactions in the Dense-phase Fluidized Part of Reaction Zone (R1)

The mean residence time of the metallic oxide particles in the reactor is 380 s. Under such operating conditions, the progress of the reaction of gasification of the coal by the vapour is 69%.

The coal gasification reaction is endothermic, the thermal energy required to maintain the reaction at 940° C. is provided both by the oxidized solid stream leaving the air reactor at 1032° C. (via line (3)) and by the reaction of the syngas resulting from the coal gasification with the oxygen-carrying solid.

To achieve gasification of the coal, a flow of 2.7 kg/s water vapour at 300° C. is supplied (through line (2)).

The resulting composition in the gas phase is as follows:

| | | |
|---|---|---|
| H2O | kg/s | 3.620 |
| H2 | kg/s | 0.115 |
| CO | kg/s | 0.999 |
| CO2 | kg/s | 7.845 |
| NO2 | kg/s | 0.141 |
| SO2 | kg/s | 0.194 |

This effluent carries along (via a line (4)) a solid phase made up of 465 kg/s oxidized solid, 103 kg/s reduced solid, 0.55 kg/s ashes and 1.18 kg/s unconverted coal (taking account of the recycled coal).

Reactions in Dilute-phase Reduction reactor (R2)

The residence time in this reactor is short and set at 4 seconds for the solids. This time is considered to be insufficient for sensitive reaction of the unreacted coal. On the other hand, in this zone, the solid accompanies the gas phase and this allows to reach the gas phase composition at the dilute zone outlet as follows:

| | | |
|---|---|---|
| H2O | kg/s | 4.486 |
| H2 | kg/s | 0.019 |
| CO | kg/s | 0.285 |
| CO2 | kg/s | 8.966 |
| NO2 | kg/s | 0.141 |
| SO2 | kg/s | 0.194 |

The flow rate of the solid stream sent back to the oxidation reactor is 566 kg/s.

Separation (S3)

Separator (S3) is dimensioned and operated so as to obtain a gas flow for which the velocity is imposed at 1.0 m/s. The separation efficiency obtained thus is 74% (% unburnt solids recovered in line (10)/amount of coal fed into the reactor).

Thus, 0.88 kg/s unburnt solids are recycled and fed again, through lines (19) and (20), into the dense fluidized part of reaction zone (R1). On the other hand, 0.31 kg/s are sent with the oxygen-carrying solid to oxidation zone (R4) via lines (13) and (15).

The resulting $CO_2$ capture rate is 90.2%. 0.79 kg/s makeup vapour is supplied through line (9) and used in fluidization zone (F4).

Dimensioning

On the basis of the above material balance, a unit size can be determined for the reduction reactor that is the object of the invention.

In reaction zone (R1), the dimensioning criterion is the circulation of the gases whose rate is 0.75 m/s, the void fraction of the dense fluidized bed being 65%.

In second reaction zone (R2), the dimensioning criterion is the circulation of the gases whose rate is 7.5 m/s, the void fraction of the dense fluidized bed being 99%.

In separation zone (S3), the dimensioning criterion is the circulation of the gases in the upper part, above the outlet coming from second reaction zone (R2). The superficial gas velocity is set at 1.0 m/s above the outlet of (R2), and at 0.1 m/s below, i.e. in fluidization zone (F4). The clearance height above the bed is set equal to the diameter. The height below the outlet of second reaction zone (R2) is 4 m.

The size of the main elements is thus deduced:

|  | R1 | R2 | S3 |
|---|---|---|---|
| height (m) | 8.05 | 17.0 | 11.0 |
| diameter (m) | 6.77 | 2.45 | 7.03 |

These elements being superimposed one above the other for a sequence (R1), (R2), then (S3), the total height of the unit is approximately 35 m.

Thermal Balance

The chemical combustion loop is widely exothermic. The temperature is set at 130° C., the heat recovery is distributed among the solid and the heat recovery on the fumes as follows:

| Heat exchanger on solid (F4) | 42.8 MWth |
|---|---|
| Heat recovery on fumes | 55.7 MWth |

In the end, an energy of 90.5 MWth is recovered after deduction of the energy required for fluidization vapour generation.

The invention claimed is:

1. A combustion method for a solid feed using a chemical loop wherein an oxygen-carrying material circulates, said method comprising at least:
   supplying metallic oxide particles to a first reaction zone, the first reaction zone comprising a chamber,
   contacting the solid feed particles with the supplied metallic oxide particles in the first reaction zone operating in dense fluidized bed mode,
   transferring the supplied metallic oxide particles and gaseous effluents from the first reaction zone to a second reaction zone, the second reaction zone comprising an elongated reactor positioned above the first reaction zone,
   carrying out combustion of the gaseous effluents from the first reaction zone in the presence of the metallic oxide particles supplied to the first reaction zone in the second reaction zone operating in dilute fluidized bed mode,
   separating in a separation zone the unburnt particles and the metallic oxide particles within a mixture coming from second reaction zone comprising combustion gas, unburnt particles and metallic oxide particles,
   re-oxidizing the metallic oxide particles in an oxidation zone prior to sending them back to first zone.

2. A method as claimed in claim 1, wherein the mixture of particles to be separated in separation zone is supplied in a dilute phase of the fluidized bed of this zone.

3. A method as claimed in claim 1, wherein the solid feed is selected from among coal, coke, pet coke, biomass, bituminous sands and household waste.

4. A method as claimed in claim 1, wherein the mean residence time of the solid phase in reaction zone ranges between 0.25 and 20 minutes, and the superficial gas velocity ranges between 0.3 and 3 m/s.

5. A method as claimed in claim 1, wherein the mean residence time of the gas in second zone ranges between 1 and 20 seconds, and the mean residence time of the solids ranges between 2 seconds and 1 minute, the void fraction in zone being above 0.9.

6. A method as claimed in claim 1, wherein, in separation zone, a gas flow of imposed velocity is induced at least at 80% by the gaseous combustion effluent containing the particles from second zone, the other part being provided by a gas coming from an external source.

7. A method as claimed in claim 1, wherein, in separation zone, the superficial gas velocity in the dilute phase of the separation zone is set at a value ranging between 30 and 300% of the mean terminal fall velocity of the oxygen-carrying particles.

8. A method as claimed in claim 7, wherein, in separation zone, the superficial gas velocity in the dilute phase of the separation zone is set at a value ranging between 50 and 150% of the mean terminal fall velocity of the oxygen-carrying particles.

9. A method as claimed in claim 1, wherein at the outlet of separation zone, the gas stream containing the light particles and a fraction of oxygen-carrying particles is sent to at least one gas-solid separation stage so as to recover nearly all of the particles contained in the gas stream coming from separation zone, which are then recycled to first reaction zone.

10. A method as claimed in claim 1, wherein a mixture of particles and of gas is allowed into the enclosure of separation zone, the particles are extracted through an outlet in the upper part of the enclosure and a discharge line in the lower part of this enclosure, the intake and extraction parameters being so selected as to create in the enclosure a lower dense phase and an upper dilute phase, a dilute phase into which said mixture is allowed.

11. A plant for carrying out combustion of a solid feed, said plant comprising at least:
   a first reaction zone comprising a solid feed, a fluidization gas and an oxygen-carrying particle feed point, the first reaction zone having a temperature between 800 and 1000° C. and being a dense fluidized bed reaction zone,
   a second reaction zone receiving, through a feed point, combustion gases containing particles from the first reaction zone, the second reaction zone having a temperature between 800 and 1000° C. and being a diluted fluidized bed reaction zone, the second reaction zone comprising an outer wall and a fresh oxygen-carrying solid feed point,
   a solid particle separation zone receiving, through intake, a gaseous combustion effluent from the second reaction zone, containing ashes, oxygen-carrying particles and unburnt particles, the solid particle separation zone comprising:
      an enclosure having an inner wall, an annular space between the inner wall and the outer wall of the second reaction zone, and an intake comprising an opening of the second reaction zone positioned above a portion of the annular space, an oxidation zone supplied with oxygen-carrying particles by the solid particle separation zone and with air.

12. A plant as claimed in claim 11, wherein the second reaction zone comprises an oxygen feed point.

13. A plant as claimed in claim 11, wherein separation zone comprises a discharge line arranged in the lower part of the enclosure and an outlet line arranged in the upper part of the device, the intake and discharge/outlet parameters being so selected as to create in the enclosure a dense phase in the lower part and a dilute phase in the upper part, and wherein said delivery line opening into the dilute phase.

14. A plant as claimed in claim 13, wherein the enclosure of separator also comprises a delivery line for a gas coming from an external source.

15. A plant as claimed in claim 11, wherein the section of flow of second reaction zone is smaller than the section of flow of first reaction zone.

16. A plant as claimed in claim 11, also comprising at least one gas-solid separation stage for recovering the particles contained in the gas stream from separation zone and for recycling them through a line to first reaction zone.

17. A plant as claimed in claim 16, comprising two gas-solid separation stages wherein one of the separation stages is supplied with a gas stream containing particles coming from the other separation stage.

18. A plant as claimed in claim 17, wherein at least one enclosure containing a fluidized bed for separation of the light particles remaining among the unburnt particles is present on lines.

19. A plant as claimed in claim 11, wherein a connection between the second reaction zone and the solid particle separation zone comprises of a divergent cone, at an angle preferably ranging between 6° and 30°.

20. A plant as claimed in claim 11, wherein a connection between the second reaction zone and the solid particle separation zone comprises an insert in form of a divergent cone to facilitate the distribution of the mixture coming from second reaction zone over the entire section of the solid particle separation zone.

21. A method as claimed in claim 1, wherein the second reaction zone is narrower than the first reaction zone.

22. A plant for carrying out combustion of a solid feed, said plant comprising:

a first reaction zone comprising a chamber, a solid feed, a fluidization gas and a oxygen-carrying particle feed point, the first reaction zone having a temperature between 800 and 1000° C. and being a dense fluidized bed reaction zone, a second reaction zone positioned above the first reaction zone, the second reaction zone comprising an elongated reactor having an outer wall and receiving, through a feed point, the combustion gases containing particles from the first reaction zone, the second reaction zone having a temperature between 800 and 1000° C. and being a dilute fluidized bed reaction zone, a solid particle separation zone receiving, through intake, a gaseous combustion effluent from the second reaction zone, containing ashes, oxygen-carrying particles and unburnt particles, the solid particle separation zone comprising:

an enclosure having an inner wall, an annular space between the inner wall and the outer wall of the elongated reactor of the second reaction zone, and an intake comprising an opening of the second reaction zone positioned above a portion of the annular space, an oxidation zone supplied with oxygen-carrying particles by the separation zone and with air.

23. A plant as claimed in claim 22, wherein the second reaction zone is narrower than the first reaction zone.

* * * * *